(12) United States Patent
Sagawa et al.

(10) Patent No.: US 11,652,382 B2
(45) Date of Patent: May 16, 2023

(54) MOTOR WIRING MEMBER

(71) Applicant: Hitachi Metals, Ltd., Tokyo (JP)

(72) Inventors: Masanori Sagawa, Tokyo (JP); Yuta Sugiyama, Tokyo (JP); Keisuke Fukuchi, Tokyo (JP); Yukio Ikeda, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 107 days.

(21) Appl. No.: 17/393,829

(22) Filed: Aug. 4, 2021

(65) Prior Publication Data
US 2022/0045570 A1 Feb. 10, 2022

(30) Foreign Application Priority Data

Aug. 7, 2020 (JP) .............. JP2020-134651

(51) Int. Cl.
*H02K 11/00* (2016.01)
*H02K 3/50* (2006.01)
*H02K 3/28* (2006.01)
*H02H 9/04* (2006.01)
*H02P 27/06* (2006.01)
*H02K 5/22* (2006.01)

(52) U.S. Cl.
CPC .............. *H02K 3/50* (2013.01); *H02H 9/042* (2013.01); *H02K 3/28* (2013.01); *H02K 5/225* (2013.01); *H02K 11/0094* (2013.01); *H02P 27/06* (2013.01); *H02K 2203/06* (2013.01)

(58) Field of Classification Search
CPC .... H02K 11/0094; H02K 11/02; H02K 11/26; H02K 11/27; H02K 2203/06; H02K 2203/09
See application file for complete search history.

(56) References Cited

FOREIGN PATENT DOCUMENTS

JP 2014-132811 A 7/2014

*Primary Examiner* — Ramon M Barrera
(74) *Attorney, Agent, or Firm* — Thomas W. Cole; Calderon Safran & Cole P.C.

(57) ABSTRACT

A motor wiring member configured to supply three-phase alternating current to a motor includes conductive wires, each of which has a connecting portion being provided at one end and being configured to be connected to a coil end of a stator of the motor, a terminal being provided at an other end of each conductive wire and being configured to be connected to an electrode of a terminal block, and a surge suppression section being configured to suppress an overvoltage from being applied to the motor. The surge suppression section includes three series circuits, each of which includes a resistor and a capacitor. One ends of the three series circuits are electrically connected to the conductive wires of respective phases, and other ends of the three series circuits are electrically connected to each other. The surge suppression section is provided along with the conductor wires near the terminal and is located between the terminal and the connecting portion.

7 Claims, 8 Drawing Sheets

MOTOR WIRING MEMBER

CROSS-REFERENCE TO RELATED APPLICATION

The present application is based on Japanese patent application No. 2020-134651 filed on Aug. 7, 2020, the entire contents of which are incorporated herein by reference.

BACKGROUND OF THE INVENTION

1. Field of the Invention

The present invention relates to a motor wiring member (a wiring member for a motor).

2. Description of the Related Art

A motor wiring member configured to supply three-phase alternating current from an inverter to a motor has been known. The motor wiring member has multiple conductive wires (electrical wires), each of which connects a coil (inductor) end of a stator in the motor to an electrode in a terminal block.

An inverter outputs a pulse voltage modulated by Pulse Width Modulation (PWM). When this pulse voltage rises, a surge voltage is generated, which may cause an overvoltage to be applied to the motor. A surge suppressor (i.e., surge-suppressing apparatus) is used to suppress such a surge voltage and to suppress overvoltage being applied to the motor (see e.g., JP 2014-132811A). Conventionally, the surge suppressor is typically provided separately (i.e., as a separate body) from the inverter and the motor.

[Patent Document 1] JP 2014-132811A

SUMMARY OF THE INVENTION

However, if a surge suppression section is provided separately from an inverter or motor, a space dedicated for installing the surge suppressor will be required. It is sometimes difficult to securely provide the space dedicated to the surge suppressor in confined spaces within a vehicle equipped with these devices.

Therefore, an object of the present invention is to provide a motor wiring member with surge suppression, which does not require the provision of a dedicated space for installing a surge suppressor.

For solving the above problem, one aspect of the invention provides: a motor wiring member configured to supply three-phase alternating current to a motor, comprising:

conductive wires, each of which comprises a connecting portion being provided at one end and being configured to be connected to a coil end of a stator of the motor;

a terminal being provided at an other end of each conductive wire and being configured to be connected to an electrode of a terminal block; and a surge suppression section being configured to suppress an overvoltage from being applied to the motor, wherein the surge suppression section comprises three series circuits, each of which includes a resistor and a capacitor, wherein one ends of the three series circuits are electrically connected to the conductive wires of respective phases, and other ends of the three series circuits are electrically connected to each other, and wherein the surge suppression section is provided along with the conductor wires near the terminal and is located between the terminal and the connecting portion.

Points of Invention

According to the invention, it is possible to provide a motor wiring member with surge suppression, which does not require the provision of a dedicated space for installing a surge suppressor.

BRIEF DESCRIPTION OF THE DRAWINGS

Next, preferred embodiment according to the present invention will be described with reference to appended drawings, wherein.

DETAILED DESCRIPTION OF THE PREFERRED EMBODIMENTS

Embodiments

Next, the preferred embodiments according to the present invention will be described below in conjunction with appended drawings.

(Description of the Motor)

Figure 1A:
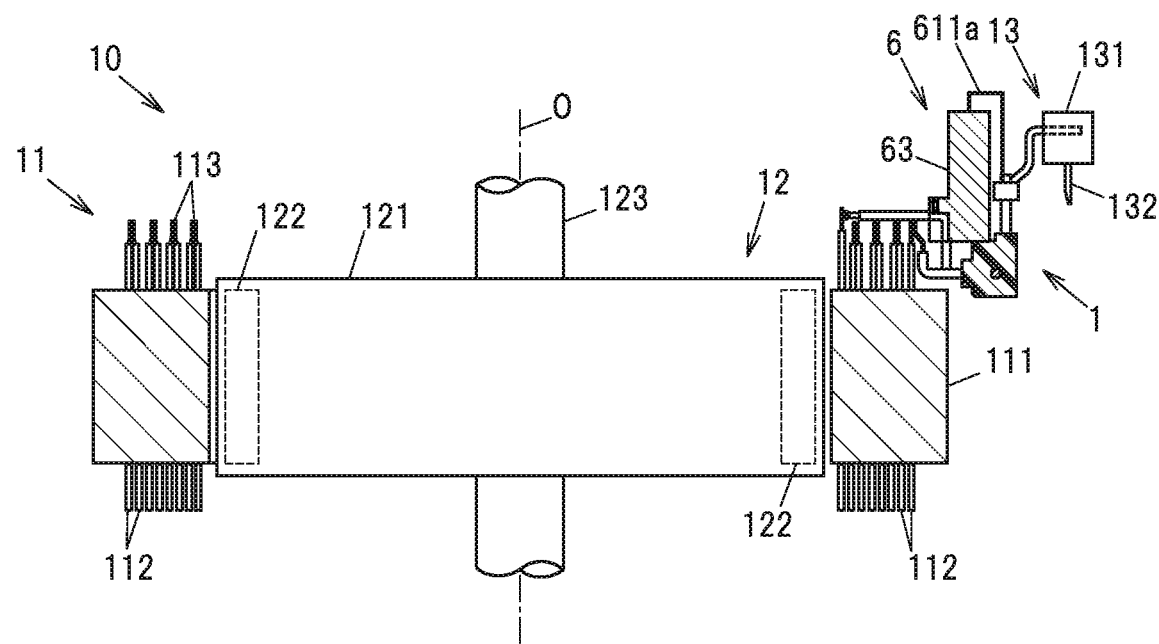
FIG. 1A is a diagram showing an overall view of a configuration example of a motor with a motor wiring member in an embodiment of the present invention.
Figure 1B:
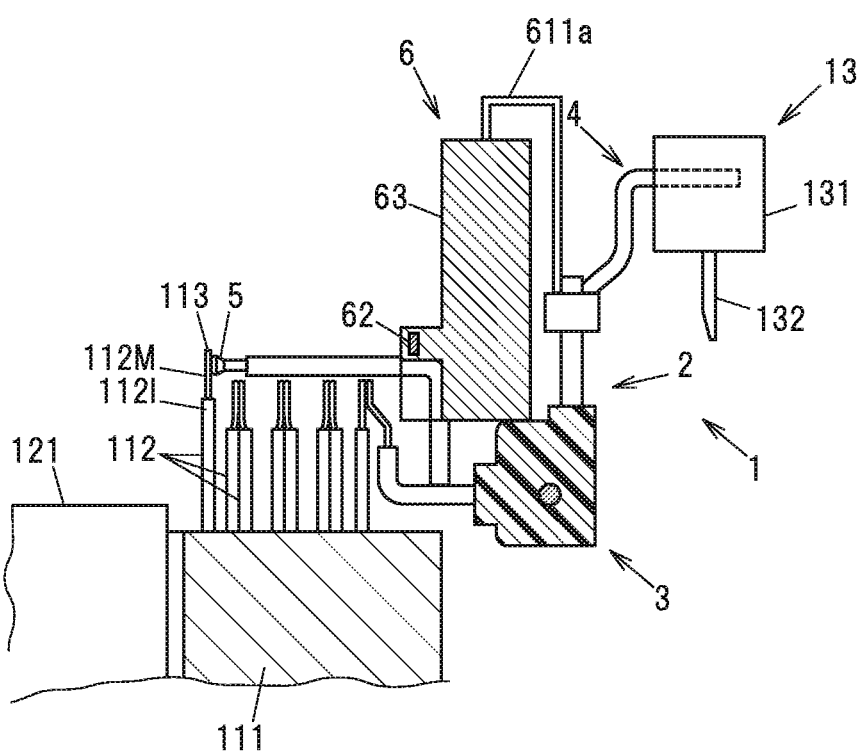
FIG. 1B is a diagram showing a partial enlarged view of FIG. 1A.

FIG. 1A is a diagram showing an overall view of a configuration example of a motor with a motor wiring member in an embodiment of the present invention. FIG. 1B is a diagram showing a partial enlarged view of FIG. 1A. A motor 10 will be installed in a vehicle configured to be driven by electric power, such as electric vehicle and so-called hybrid vehicle.

The motor 10 has a rotor (rotating member) 12, a stator (stating member) 11 arranged around the rotor 12, and a terminal block 13. The rotor 12 includes a rotor core 121, which is made of soft magnetic metal, and plural magnets 122 embedded in the rotor core 121, and is configured to rotate with a shaft 123 which is inserted through a center of the rotor 12. A stator 11 includes a stator core 111 made of soft magnetic metal, and plural coil pieces (coil segments) 112.

In the following description, a direction parallel to a rotation axis line O of the shaft 123 is referred to as "axial direction", a direction passing through the rotation axis line O and perpendicular to the rotation axis line O is referred to as "radial direction", and a direction perpendicular to the axial direction and the radial direction is referred to as "circumferential direction. Hereinafter, for the convenience of explanation, for both sides of the axial direction of the stator core 111, one side on which a motor wiring member 1 is located is referred to as "upper side", and the other side opposite to the upper side is referred to as "lower side". However, the upper and lower sides do not specify the vertical up and down positions of the vehicle when the motor 10 is installed in the vehicle.

Although not shown, the stator core 111 has a cylindrical back yoke, and plural teeth protruding from the back yoke in the radial direction, that are formed integrally (as one piece). Slots are provided in such a manner that each slot is formed between teeth adjacent to each other in the circumferential direction. Each coil piece 112 is housed and held in each slot in the stator core 111.

The coil piece 112 is composed of a conductive metal 112M, such as copper, aluminum, or the like having a high electrical conductivity, and an electrically insulative coating layer 1121 for covering a surface of the conductive metal 112M. In the present embodiment, the conductive metal 112M is a flat single wire with a rectangular cross section, and the coating layer 1121 is made of enamel coating. At a coil end 113, which is an end of the coil piece 112, the coating layer 1121 is removed to expose the conductive metal 112M. Respective coil pieces 112 are welded together at the coil ends 113 to provide two pairs of three-phase (U phase, V phase, and W phase) stator windings, in which the phases of the electrical angle are offset by a predetermined angle.

The motor 10 includes a housing (not shown) which houses the stator 11, and the terminal block 13 which is secured to the housing. The terminal block 13 has a base block 131 which is made of a resin and fixed to the housing, and three electrodes 132, which are supplied by an inverter with three-phase alternating current (pulse signal generated by pulse width modulation).

In addition, the motor 10 includes the motor wiring member 1 according to the present embodiment. The motor wiring member 1 is a component for connecting the coil end 113 of the stator 11 to the electrode 132 of the terminal block 13, and configured to supply the three-phase alternating current from the inverter via the electrode 132 of the terminal block 13 to the stator windings of respective phases of the motor 10. The details of the motor wiring member 1 will be described below.

(Description of the Motor Wiring Member 1)

Figure 2A:
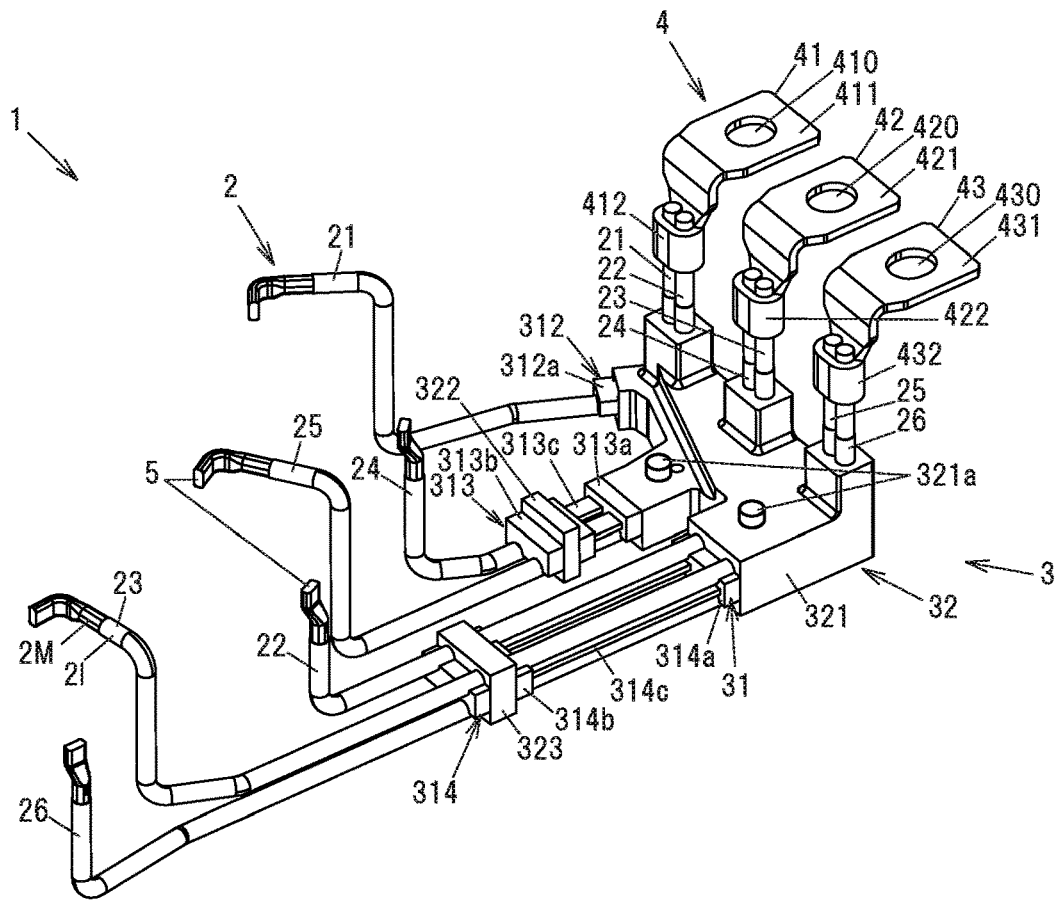
FIGS. 2A and 2B are diagrams showing perspective views of the motor wiring member from which a surge suppression section is omitted.
Figure 2B:
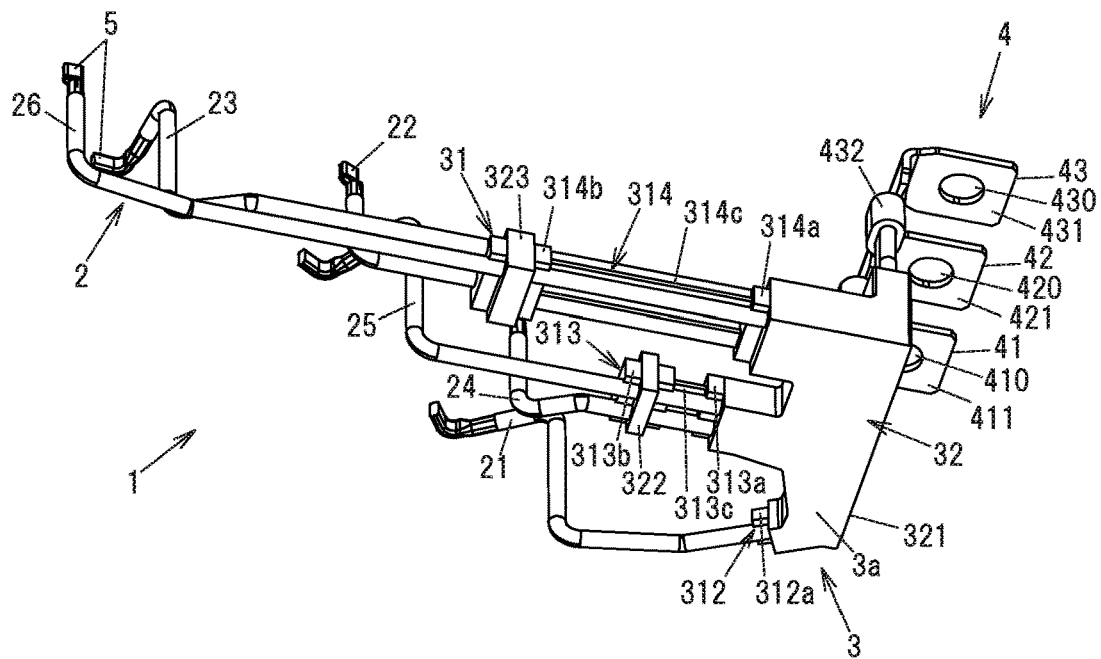
Figure 3:
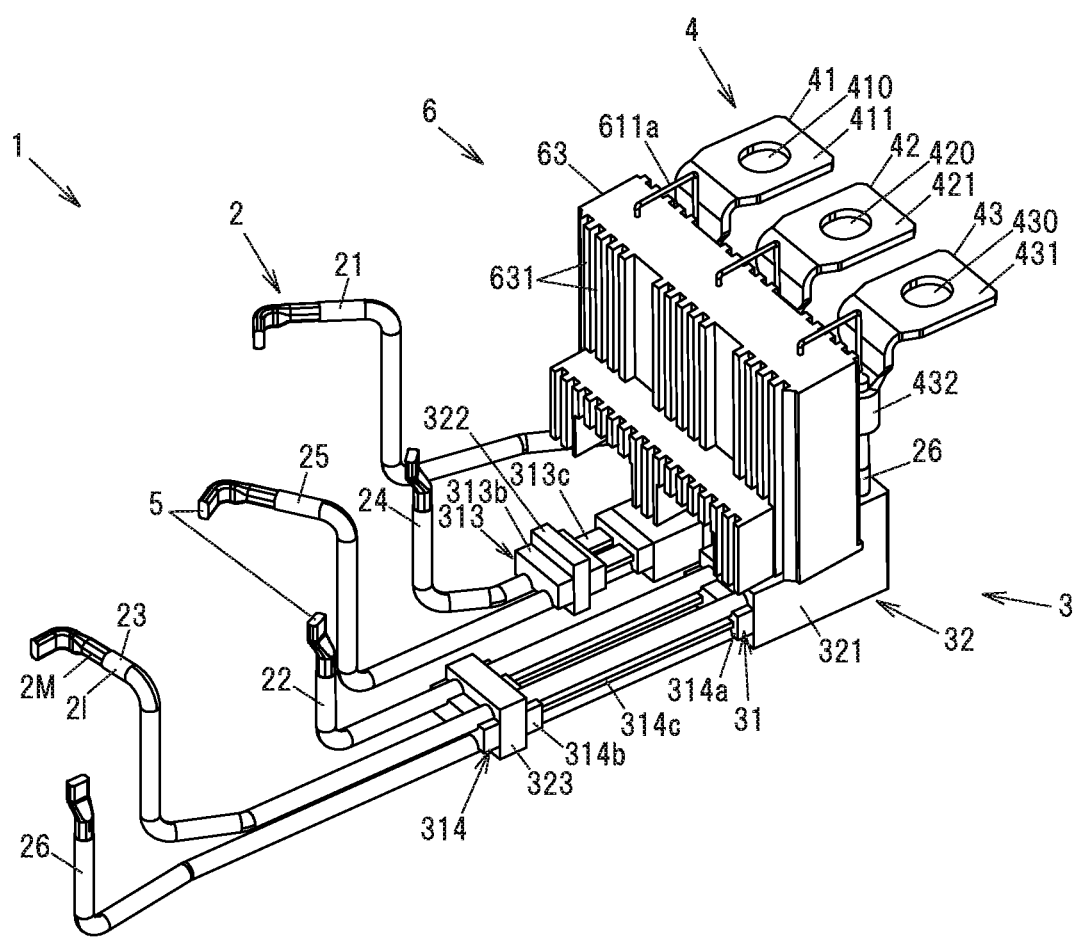
FIG. 3 is a diagram showing a perspective view of the motor wiring member.

FIGS. 2A and 2B are diagrams showing perspective views of the motor wiring member 1 from which a surge suppression section is omitted. FIG. 3 is a diagram showing a perspective view of the motor wiring member 1.

As shown in FIGS. 1A, 1B and 3, the motor wiring member 1 includes plural conductive wires 2, and a holding section 3 for holding plural conductive wires 2, and a surge suppression section 6 for suppressing over-voltage being applied to the motor 10 (i.e., to the stator windings of respective phases of the motor 10).

In the present embodiment, the motor wiring member 1 has six conductive wires 2, and three terminals 4, and is configured to connect the three electrodes 132 at the terminal block 13 with the coil ends 113 of the coil pieces 112 for respective phases. As the motor wiring member, so-called bus ring including the conductive wire which is formed in an annular shape (ring shape) has been known. However, the motor wiring member 1 in the present embodiment is different from the bus ring, and is a non-annular wiring member including the conductive wire 2 which is not formed in an annular shape. Further, the six conductive wires 2 are rigid enough to retain their shape. In addition, each of the six conductive wires 2 has a circular shape in cross section perpendicular to the longitudinal direction. The number of the conductive wires 2 is not limited to six but should be a multiple of three (3).

The six conductive wires 2 are composed of first and second U phase lead wires 21, 22, and first and second V phase lead wires 23, 24, and first and second W phase lead wires are 25, 26. Each of the conductive wires 2 includes a conductor 2M, which is made of conductive metal, and an electrically insulative coating layer 2I for covering a surface of the conductor 2M. As the conductive metal, e.g., copper or copper alloy may be preferably used. As the coating layer 2I, enamel coating may be preferably used. The conductor 2M is a single wire (a single metal conductor, not a twisted wire), and in the present embodiment, a round single wire with a circular cross section is formed into a predetermined shape by pressing. However, it is possible to make the conductor 2M of a flat single wire with a rectangular cross section.

The three terminals 4 are composed of a U phase terminal 41, a V phase terminal 42 and a W phase terminal 43. The U phase terminal 41 has a plate section 411 connected to the U phase electrode 132 at the terminal block 13, and a crimping section 412 where both ends of the first and second U phase lead wires 21, 22 are crimped together. The plate section 411 has a notch 410 which opens opposite the crimping section 412 and is formed in a substantially U-shape. A bolt (not shown), which is inserted into the notch 410, connects the plate section 411 to the U phase electrode 132 at the terminal block 13. Similarly, the V phase terminal 42 has a plate section 421 connected to the V phase electrode 132 at the terminal block 13, and a crimping section 422 where the first and second V phase lead wires 23, 24 are both crimped together. The plate section 421 has a notch 420 which opens opposite the crimping section 422, and is formed in a substantially U-shape. A bolt (not shown), which is inserted into the notch 420, connects the plate section 421 to the V phase electrode 132 at the terminal block 13. Similarly, the W phase terminal 43 has a plate section 431 connected to the W phase electrode 132 at the terminal block 13, and a crimping section 432 where the first and second W phase lead wires 25, 26 are both crimped together. The plate section 431 is formed with a notch 430 which opens opposite the crimping section 432, and is formed in a substantially U-shape. A bolt (not shown), which is inserted into the notch 430, connects the plate section 431 to the W phase electrode 132 at the terminal block 13.

The other end (opposite to the terminal 4) of each conductive wire 2 is provided with a connecting portion (joining portion) 5 in which the coating layer 2I is removed over a range with a predetermined length to expose the conductor 2M. The connecting portion 5 is welded to the coil end 113 of the corresponding coil piece 112 by TIG (Tungsten Inert Gas) welding, which is a method of welding by arc discharge with inert gas. An opposing face of the coil end 113 at the connecting portion 5 is made planar by pressing.

The holding section 3 is configured to cover a portion of the plural conductive wires 2 together and hold all the conductive wires 2 together. The holding section 3 includes a holder 31 for holding each conductive wire 2 in a predetermined wire shape, and a resin mold section 32, which comprises a molded resin to cover a portion of the holder 31 and the conductive wire 2. The holder 31 functions for reducing the displacement of the conductive wire 2 due to a resin pressure during molding of the resin mold section 32, and maintaining the conductive wire 2 in a predetermined wiring shape. The holding section 3 (holder 31) may be configured to cover bending portions (substantially L-shaped portions) of the plural conductive wires 2 together and hold all the conductive wires 2 together.

The holder 31 has a main body (not shown) configured to be covered by a first resin mold section 321 (to be described below), and first to third extending portions 312 to 314 that extend out of the first resin mold section 321. The holder 31 is made of, e.g., PPS (polyphenylene sulfide).

The first extending section 312 is formed along the first U phase lead wire 21, which extends from the holding section 3 toward the coil end 113, and has a regulating section 312a with a groove for regulating a position of the first U phase lead 21. The second extending section 313 is formed along the second V phase lead wire 24 and the first W phase lead wire that extend from the holding section 3 toward the coil end 113, and has a pair of regulating sections 313a, 313b which have grooves for regulating the position of both lead wires 24, 25, and a plate-like coupling section 313c, which couples the both regulating sections 313a, 313b. One regulating section 313a is coupled to an edge of the main body, and the other regulating section 313b is coupled to the one regulating section 313a via a coupling section 313c. Similarly, the third extending section 314 is formed along the second U phase lead wire 22, the first V phase lead wire 23, and the second W phase lead wire 26 that extend from the holding section 3 toward the coil end 113, and has a pair of regulating sections 314a, 314b that have grooves for regulating the positions of the respective lead wires 22, 23, and 26, and a plate-like coupling section 314c, which couples the both regulating sections 314a, 314b. One regulating section 314a is coupled to the edge of the main body, and the other regulating section 314b is coupled to the one regulating section 314a via the coupling section 314c.

The resin mold section 32 has the first resin molding section 321, which covers the main body of the holder 31 and six conductive wires 2 together, and the second and third resin molding sections 322, 323 that are separated from the first resin molding section 321. The second resin molding section 322 is formed to cover a center part of the regulating section 313b at the second extending section 313, the second V phase lead wire 24, and the first W phase lead wire 25. The second resin molding section 322 functions for securing both lead wires 24, 25 to the regulating section 313b. Similarly, the third resin molding section 323 is formed to cover a center part of the regulating section 314b at the third extending section 314, the second U phase lead wire 22, and the first V phase lead wire 23, and the second W phase lead wire 26. The third resin molding section 323 functions for securing the respective lead wires 22, 23, and 26 to the regulating section 314b. The resin mold section 32 is preferably made of the same material as the holder 31, e.g., PPS (polyphenylene sulfide).

In the present embodiment, the main body of the holder 31 and the first resin molding section 321 constitute a coupling section that covers and couples the plural conductive wires 2 together. In the present embodiment, the second resin molding section 322 and the second extending section 313 as well as the third resin molding section 323 and the third extending section 314 constitute a separate holding section configured to cover some of the conductive wires 2.

(Description of the Surge Suppression Section 6)

Figure 4A:
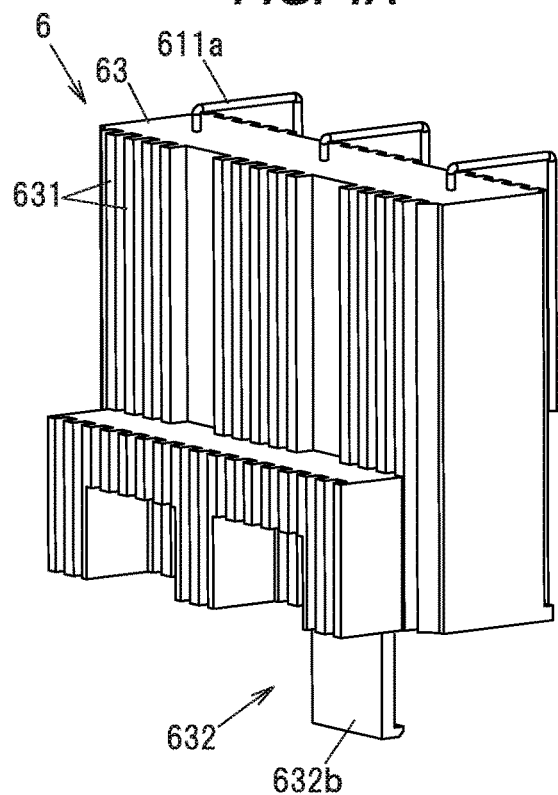
FIGS. 4A and 4B are diagrams showing perspective views of the surge suppression section.
Figure 4B:
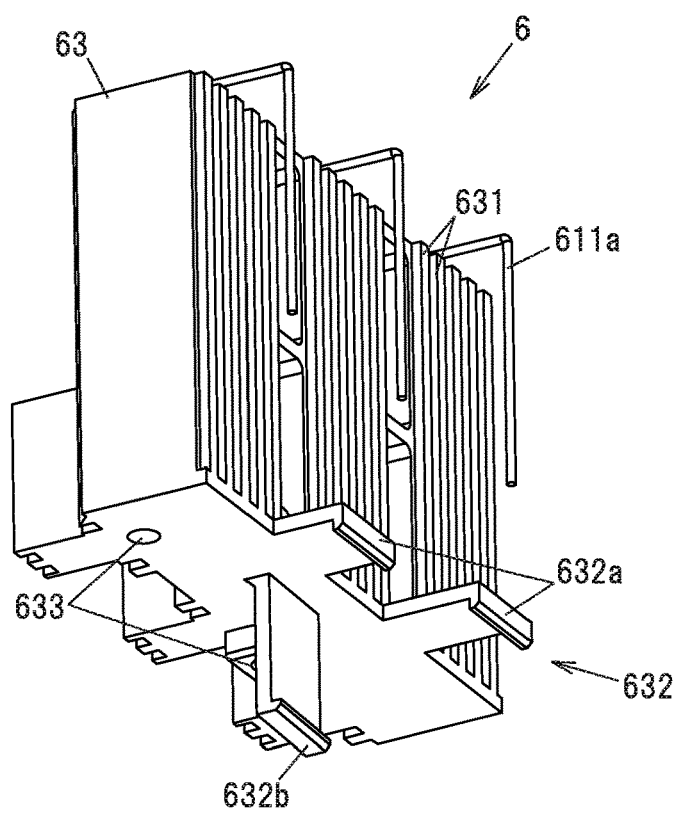
Figure 5A:
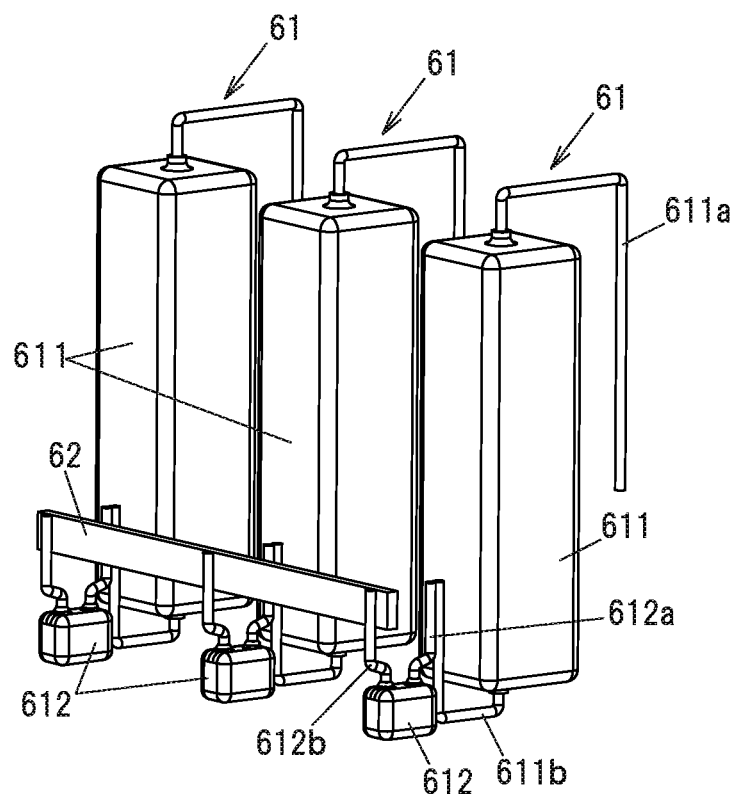
FIG. 5A is a diagram showing a perspective view of the surge suppression section from which a cover is omitted.
Figure 5B:
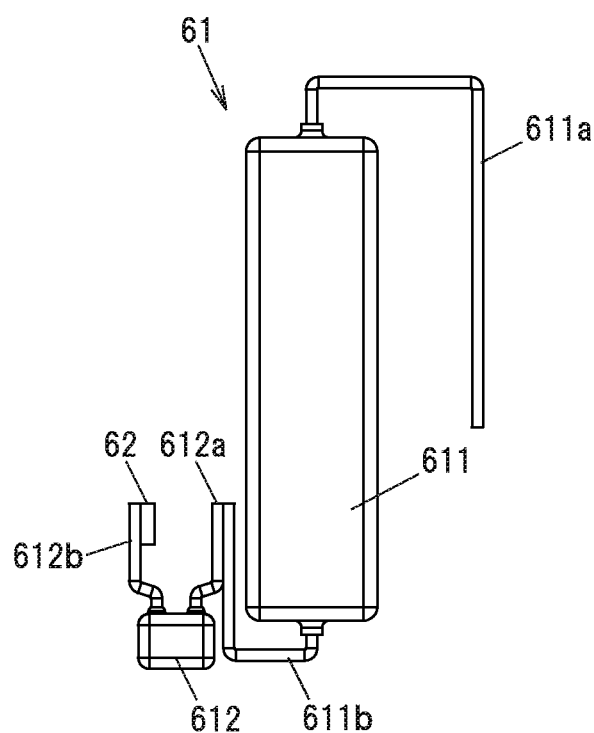
FIG. 5B is a diagram showing a side view of the surge suppression section from which the cover is omitted.
Figure 6:
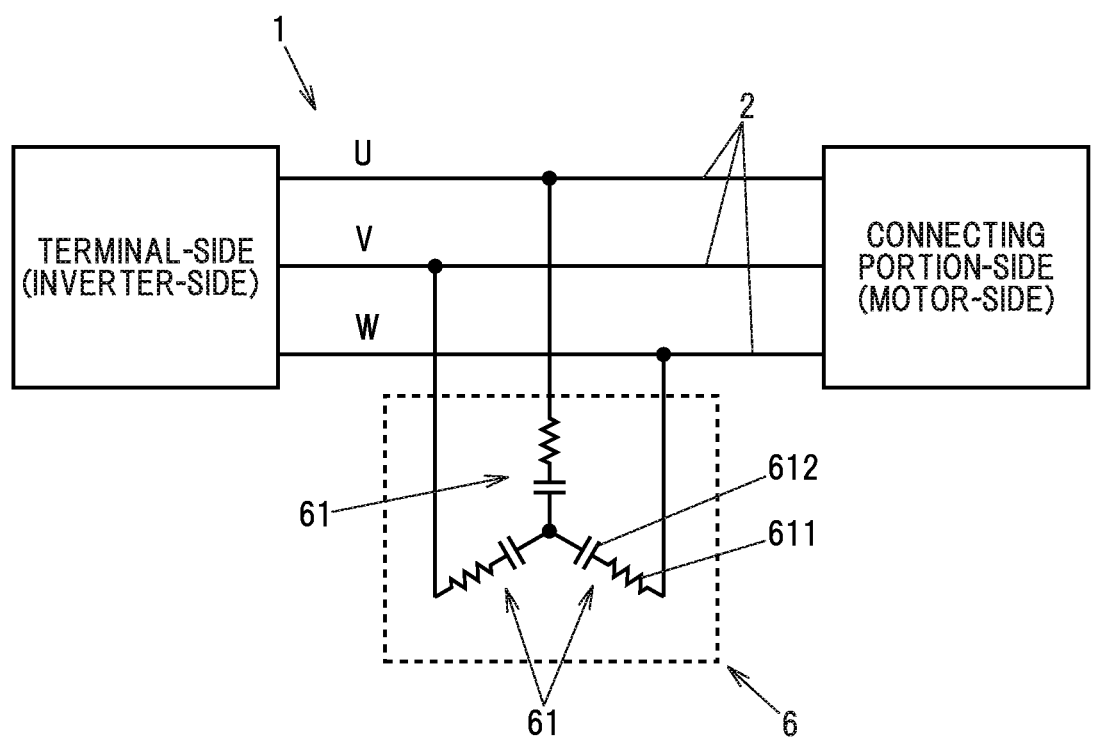
FIG. 6 is a circuitry diagram of the surge suppression section.

FIGS. 4A and 4B are diagrams showing perspective views of the surge suppression section 6. FIG. 5A is a diagram showing a perspective view of the surge suppression section 6 from which the cover is omitted. FIG. 5B is a diagram showing a side view of the surge suppression section 6 from which the cover is omitted. FIG. 6 is a circuitry diagram of the surge suppression section 6. As shown in FIGS. 4A to 6, the motor wiring member 1 in the present embodiment has the surge suppression section 6 to suppress the overvoltage applied to the motor 10.

The surge suppression section 6 is arranged along the conductive wires 2 near the terminals 4, and is located closer to the connecting portions 5 (on the side of the coil end 113 side, a center side of the stator 11) rather than the terminals 4 (on the side of the terminal block 13), and then is integrated with the motor wiring member 1. In other words, the surge suppression section 6 is located between the terminals 4 (terminal block 13) and the connecting portions 5, and is integrated with the motor wiring member 1. As a result, it is not necessary to install a surge suppressor separately from the inverter or motor, and it is enough to install the motor wiring member 1. Therefore, the assembly process becomes easier. This configuration also suppresses the surge suppression section 6 from protruding outside of the terminals 4 (outwardly in the radial direction of the stator 11). Further, this configuration allows the effective use of a free space near the terminals 4. Thus, the entire motor wiring member 1 including the surge suppression section 6 is kept small and can be installed in a narrow space. In addition, the surge suppression section 6 is preferably located between the terminals 4 and the first resin molding section 321, which is a coupling portion where the plural conductive wires 2 are coupled at a location closest to the terminals 4. This configuration allows the effective use of the free space near the first resin molding section 321. Thus, it is possible to keep the entire motor wiring member 1 including surge suppression section 6 small enough to be installed in confined spaces.

For example, if the surge suppression section 6 is located just near the connecting portions 5, the heat generated from the welding of the connecting portions 5 to the coil ends 113 may damage the surge suppression section 6. Also, if the surge suppression section 6 is located near the connecting portions 5, the welding of the connecting portions 5 to the coil ends 113 may be difficult. For this reason, the surge suppression section 6 is preferably located as far away as possible from the connecting portions 5 (welded with coil ends 113), and the surge suppression section 6 is most preferably located near the terminals 4.

The surge suppression section 6 has three series circuits 61, each of which includes a resistor 611 and a capacitor 612 being connected in series. The surge suppression section 6 has a star connection structure, in which one ends of the three series circuits 61 are electrically connected to the conductive wires 2 in the respective phases, and the other ends of the three series circuits 61 are electrically connected to each other (see FIG. 6). In the present embodiment, the other ends of the three series circuits 61 are electrically connected via a busbar 62.

The resistor 611 can be made of conductive rubber or conductive plastic. For example, the resistor 611 can be formed by inserting lead wires 611a and 611b into both ends of a rod member made of conductive rubber or conductive plastic, respectively. The present invention is not limited thereto, and the resistor 611 may be formed by patterning a high resistance material such as carbon, or the resistor 611 may be formed by combining resistors with lead wires, such as those used in electrical circuits. In the present embodiment, the resistor 611 is formed in a straight shape, with lead wires 611a and 611b extending from respective ends in the longitudinal direction of the resistor 611. The lead wire 611a on one side of the resistor 611 is extended upward and bent by 90 degrees toward the terminal 4, and then bent by 90 degrees downward, and a tip (bottom edge) at the end of the lead wire 611a is fastened by crimping and electrically connected with the conductive wire 2 by crimping portions 412, 422, and 432 of the terminals 4. Welding may be carried out in addition to the crimping fixation. The other lead wire 611b of the resistor 611 is extended downward, bent by 90 degrees away from the conductive wire 2, and then bent by 90 degrees upward, and a tip (top edge) connected electrically to one lead wire 612a of the capacitor 612. To withstand the heat during the molding of the cover 63 (to be described below), it is preferable to connect the lead wire 611b of the resistor 611 to the lead wire 612a of capacitor 612 by welding.

The lead wires 612a and 612b of the capacitor 612 are arranged to extend upward, with the one lead wire 612a being electrically connected to the lead wire 611b of the resistor 611 and the other lead wire 612b being electrically connected to the busbar 62. To withstand the heat during the molding of the cover 63, it is preferable to connect the lead wire 612b of the capacitor 612 to the busbar 62 by welding.

The busbar 62 is a plate-like electrically conductive member, which is made of e.g., copper or copper alloy. In the present embodiment, the other ends of the series circuits 61 (the ends opposite to the ends connected to the conductive wires 2) are connected to each other by the busbar 62. The present invention is not limited thereto, and the other ends of the series circuit 61 may be connected to each other with a wire member such as a copper wire. However, in the embodiment, it is more preferable to use the plate-like busbar 62, which is easy to be welded, for welding the lead wire 612b of the capacitor 612 with the busbar 62, so as to withstand the heat during the molding of the cover 63 and to facilitate the alignment with the lead wire 612b of the capacitor 612. Further, it is more preferable to use a non-insulated plate-like busbar 62. To facilitate the welding, a tip of the lead wire 612b of the capacitor 612 may be machined in a U-shape (e.g., a U-shaped connection terminal may be installed), and the U-shaped section may be used to pinch the plate-like busbar 62 and then welded with the busbar 62.

In the present embodiment, the capacitor 612 is separated from the conductive wire 2 than the resistor 611 by placing the resistor 611 along the conductive wire 2 and bending the other lead wire 611b (which may be the one lead wire 612a of the capacitor 612) away from the conductive wire 2. In addition, the busbar 62 is located in such a manner that the busbar 62 and the conductive wire 2 sandwich the resistor 611. This configuration ensures that resistor 611, the capacitor 612, and the busbar 62 are aligned vertically with the longitudinal direction of the conductive wire 2. Therefore, the length along the conductive wire 2 (vertical height) of the surge suppression section 6 is reduced, so that the surge suppression section 6 is miniaturized.

The surge suppression section 6 has the cover 63 formed by molding a resin to cover the three series circuits 61 and the busbar 62 together. In order to increase heat dissipation, it is preferable to use a resin with a high thermal conductivity as much as possible for the cover 63. Specifically, it is preferable to use an insulating material that mixes engineering plastics such as PA6 (polyamide 6) and PBT (polybutylene terephthalate), which have superior formability, or super-engineering plastics such as PPS (polyphenylene sulfide), with a ceramics material that is highly insulating and has good thermal conductivity (thermal filler). These insulating heat dissipating materials are used to achieve a better thermal conductivity of 1 to 10 W/m/K, which is 5 to 50 times of the thermal conductivity of common plastic materials (approximately 0.2 W/m/K). Thus, it is possible to efficiently dissipate the heat corresponding to the surge voltage absorbed by the resistor 611 in combination with its fin shape.

The cover 63 has a substantially cuboid shape as a whole. Plural fins 631 for heat dissipation are formed on a surface on a conductive wire 2-side of the cover 63 and on a surface opposite to the conductive wire 2 of the cover 63. However, the present invention is not limited thereto. The fins 631 may be formed on a top surface, side surfaces, or a bottom surface of the cover 63. Here, the fin 631 has a plate-like protrusion shape, but the shape of the fin 631 is not limited thereto. It is also preferable that the cover 63 is installed in such a manner that the cover 63 does not contact the conductive wire 2 for better heat dissipation.

On the bottom surface of the cover 63, a positioning hole 633, into which the protrusion 321a (see FIG. 2A) formed in the first resin mold section 321 is inserted, is formed. By inserting the protrusion 321a into the positioning hole 633, the positioning of the surge suppression section 6 in relation to the first resin molding section 321 is performed. The protrusion may be formed on the bottom surface of the cover 63 and a positioning hole into which the protrusion is inserted may be provided on the side of the first resin molding section 321.

In addition, the cover 63 has an engaging section 632 configured to engage with the first resin molding section 321 of the holding section 3. The engaging section 632 has a pair of upper latches that protrude from a surface on the conductive wire 2-side of the cover 63, and a lower latch 632b which protrudes downward from the bottom surface of the cover 63. The pair of upper latches 632a are inserted between the conductive wires 2 for the adjacent phases and are engaged with a corner of the top surface of the first resin mold section 321. The lower latch 632b is inserted between the U phase lead wire 22 and the W phase lead wire 25 (between the second extending section 313 and the third extending section 314) and is engaged with a corner of the bottom surface of the first resin molding 321. The configuration of the engaging section 632 to be engaged with the first resin mold section 321 (the holding section 3) allows easy fixation of the surge suppression section 6 to the first resin mold section 321 (the holding section 3) with one touch. It is also possible to provide a pair of lower latches as well as the upper latches, and the pair of lower latches may be inserted between the conductive wires 2 for the adjacent phases.

Before manufacturing the motor wiring member 1, the surge suppression section 6 and the components other than the surge suppression section 6 in the motor wiring member should be formed as separate members. At this time, the terminals 4 are left to be unconnected to the conductive wires 2. Preferably, the resistor 611, the capacitor 612, and the busbar 62 are welded before forming the surge suppression section 6, and the welded resistor 611, capacitor 612 and busbar 62 are set into a mold. Then, a molding resin is introduced into the mold to provide the cover 63. The surge suppression section 6 thus obtained was then fixed to the first resin molding section 321 using the engaging section 632. The lead wires 611a with the conductive wires 2 are crimped and fastened together by the crimping sections 412, 422, 432 of the terminals 4, to provide the terminals 4. This results in the motor wiring member 1.

Here, the case in which the welded resistor 611, capacitor 612, and busbar 62 are set directly in the mold is described. However, the present invention is not limited thereto, and the resistor 611, the capacitor 612, and the busbar 62 may be accommodated in a holder and set into the mold to form the cover 63, so as to protect connecting portions between the resistor 611, the capacitor 612, and the busbar 62.

Figure 7A:
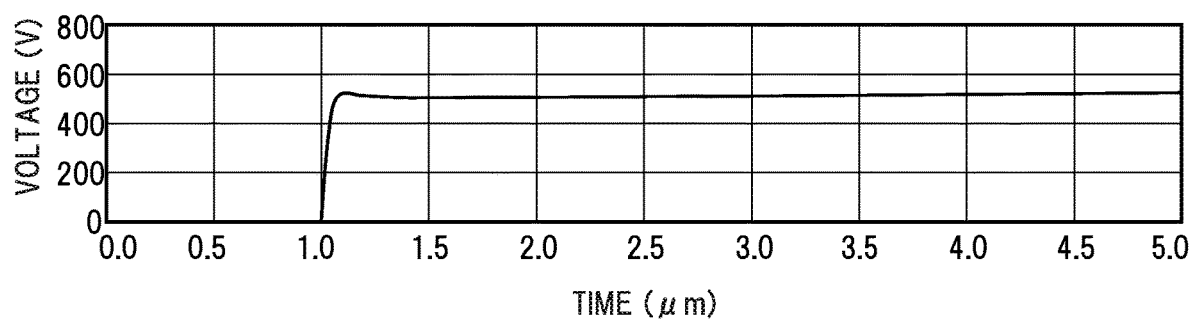
FIG. 7A is a graph showing a surge voltage in Example of the present invention.

The motor wiring member 1 according to the present embodiment was prepared as Example. A voltage waveform that occurs at the connecting portion 5 when a voltage of 500V was applied to the terminals 4 of the motor wiring member 1 in Example was calculated by simulation. The simulation results are shown in FIG. 7A. Similarly, a voltage waveform that occurs at the connecting portion 5 when a voltage of 500V was applied to the terminals 4 of the motor wiring member in Comparative example, which has the exact same configuration as Example except that the surge suppression section 6 is omitted, was calculated by simulation. The simulation results are shown in FIG. 7B.

Figure 7B:
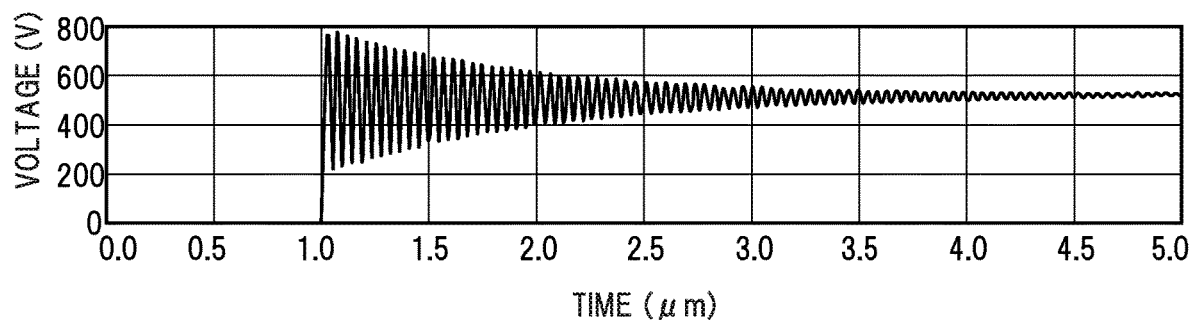
FIG. 7B is a graph showing a surge voltage in Comparative example without the surge suppression section.

As shown in FIGS. 7A and 7B, a peak value of the surge voltage is very large, i.e., approximately 780 V in Comparative example while the peak value of the surge voltage is reduced to approximately 520 V in Example. Therefore, the surge voltage was significantly reduced by providing the surge suppression section 6.

(Functions and Effects of the Present Embodiment)

As explained above, the motor wiring member 1 in the present embodiment has the surge suppression section 6 for suppressing the overvoltage applied to the motor 10. The surge suppression section 6 has the three series circuits 61 each of which has the resistor 611 and the capacitor 612, and the one ends of the three series circuits 61 are electrically connected to the conductive wires 2 of respective phases, and the other ends of the three series circuits 61 are electrically connected to each other. The surge suppression section 6 is installed along the conductive wires 2 near the terminals 4, and located between the terminals 4 and the connecting portions 5.

The surge suppression section 6 provided on the motor wiring member 1 eliminates the need for a separate surge suppressor between the motor 10 and the inverter. If a surge suppressor is installed separately, it will be necessary to ensure a space dedicated for the surge suppressor. However, according to the present embodiment, it will not be necessary to secure such dedicated space for the separate surge suppressor. In addition, the surge suppression section 6 is installed along the conductive wires 2 near the terminals 4, and between the terminals 4 and the connecting portions 5. It is possible to suppress the surge suppression section 6 from protruding far outward, and to achieve the motor wiring member 1 which can be installed even in small spaces.

(Modifications)

Figure 8A:
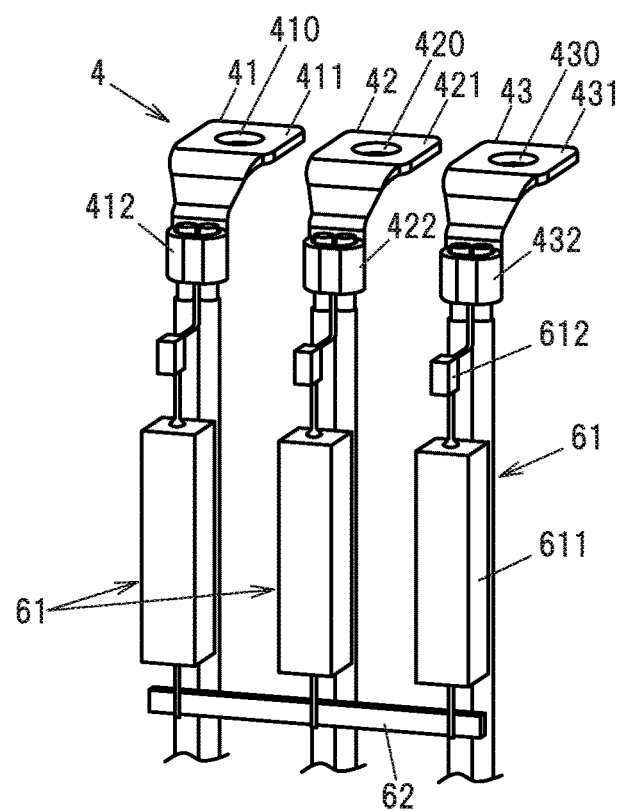
FIG. 8A is a diagram showing a perspective view of the surge suppression section of the invention without the cover.
Figure 8B:
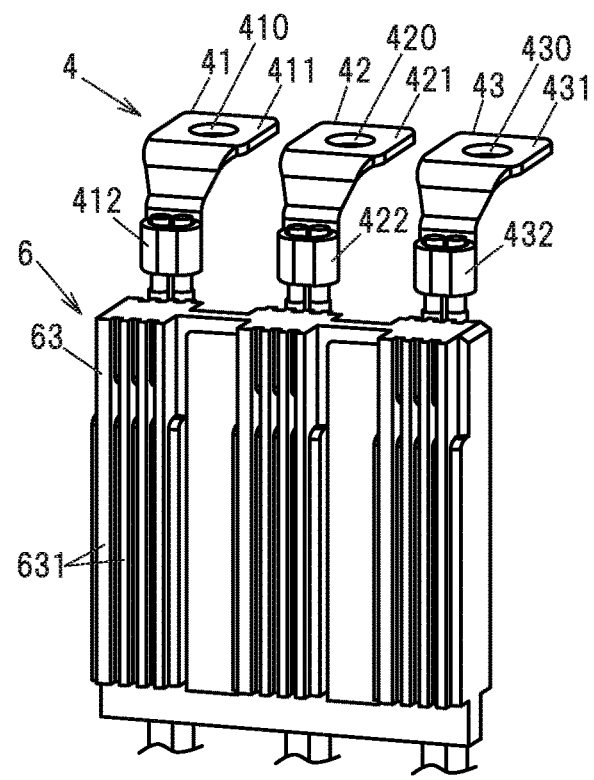
FIG. 8B is a diagram showing a perspective view of the surge suppression section of the invention with the cover.

In the above embodiment, the case where the resistor 611 is provided on the conductive wire 2-side and the lead wire 611a of the resistor 611 is connected to the conductive wire 2 in the series circuit 61 is described. However, the present invention is not limited thereto. As shown in FIGS. 8A and 8B, it may be necessary to replace the position of the resistor 611 with the position of the capacitor 612 in the series circuit 61, to locate the capacitor 612 on the conductive wire 2-side. In addition, the resistor 611, capacitor 612, and busbar 62 may be arranged in a line-up along the longitudinal direction of the conductive wires 2, as shown in FIGS. 8A and 8B. This will reduce the thickness of the surge suppression section 6 (the thickness in the direction perpendicular to the longitudinal direction and the alignment direction of the conductive wires 2). In this way, the specific shape of the surge suppression section 6 can be changed accordingly depending on the wiring shape of the conductive wires 2 and the like. It is preferable that one lead wire of the capacitor 612 is crimpled and fastened with the conductive wires 2 and electrically connected to the conductive wires 2 by the crimping sections 412, 422, and 432 of the terminals 4. It is also preferable that the lead wires of the capacitor 612 and the resistor 611 are connected together by welding, and the lead wires of the resistor 611 and the busbar 62 are connected together by welding.

(Summary of the Embodiment)

Next, the technical ideas grasped from the aforementioned embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

[1] A motor wiring member (1) configured to supply three-phase alternating current to a motor (10), comprising:
conductive wires (2), each of which comprises a connecting portion (5) being provided at one end and being configured to be connected to a coil end (113) of a stator (11) of the motor (10);
a terminal (4) being provided at an other end of each conductive wire (2) and being configured to be connected to an electrode (132) of a terminal block (13); and
a surge suppression section (6) being configured to suppress an overvoltage from being applied to the motor (10),
wherein the surge suppression section (6) comprises three series circuits (61), each of which includes a resistor (611) and a capacitor (612),
wherein one ends of the three series circuits (61) are electrically connected to the conductive wires (2) of respective phases, and other ends of the three series circuits (61) are electrically connected to each other, and
wherein the surge suppression section (6) is provided along with the conductor wires (2) near the terminal (4) and is located between the terminal (4) and the connecting portion (5).

[2] The motor wiring member (1) described in [1], wherein the other ends of the three series circuits (61) are electrically connected to each other via a busbar (62).

[3] The motor wiring member (1) described in [2], wherein each of the three series circuits (61) in the surge suppression section (6) is configured in such a manner that one lead wire (611a) of the resistor (611) is electrically connected to the conductive wire (2), an other lead wire (611b) of the resistor (611) is electrically connected to one lead wire (612a) of the capacitor (612), and an other lead wire (612b) of the capacitor (612) is electrically connected to the busbar (62), and the other lead wire (611b) of the resistor (611) or the one lead wire (612a) of the capacitor (612) is bent away from the conductive wire (2) in such a manner that the capacitor (612) is separated from the conductive wire (2) than the resistor (611).

[4] The motor wiring member (1) described in [3], wherein the busbar (62) is located in such a manner that the conductive wire (2) and the busbar (62) sandwich the resistor (611).

[5] The motor wiring member (1) described in any one of [1] to [3], wherein the surge suppression section (6) has a cover (63) comprising a molded resin to cover the three series circuits (61) together, and the cover (63) has fins (631) for heat dissipation.

[6] The motor wiring member (1) described in [5], further comprising:
a holding section (3) covering a portion of the conductive wires (2) together and holding the conductive wires (2) in a coupled state together,
wherein the cover (63) has an engaging section (632) to be engaged with the holding section (3), and
wherein the surge suppression section (6) is secured to the holding section (3) by engaging the engaging section (632) with the holding section (3).

[7] The motor wiring member (1) described any one of [1] to [6], wherein the one ends of the three series circuits (61) of the surge suppression section (6) are fastened by crimping to the terminals (4) and electrically connected to the conductive wires (2) of respective phases.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A motor wiring member configured to supply three-phase alternating current to a motor, comprising:
conductive wires, each of which comprises a connecting portion being provided at one end and being configured to be connected to a coil end of a stator of the motor;
a terminal being provided at an other end of each conductive wire and being configured to be connected to an electrode of a terminal block; and
a surge suppression section being configured to suppress an overvoltage from being applied to the motor,
wherein the surge suppression section comprises three series circuits, each of which includes a resistor and a capacitor,
wherein one ends of the three series circuits are electrically connected to the conductive wires of respective phases, and other ends of the three series circuits are electrically connected to each other, and
wherein the surge suppression section is provided along with the conductive wires near the terminal and is located between the terminal and the connecting portion.

2. The motor wiring member according to claim 1, wherein the other ends of the three series circuits are electrically connected to each other via a busbar.

3. The motor wiring member according to claim 2, wherein each of the three series circuits in the surge suppression section is configured in such a manner that one lead wire of the resistor is electrically connected to the conductive wire, an other lead wire of the resistor is electrically connected to one lead wire of the capacitor, and an other lead wire of the capacitor is electrically connected to the busbar, and the other lead wire of the resistor or the one lead wire of the capacitor is bent away from the conductive wire in such a manner that the capacitor is separated from the conductive wire than the resistor.

4. The motor wiring member according to claim 3, wherein the busbar is located in such a manner that the conductive wire and the busbar sandwich the resistor.

5. The motor wiring member according to claim 1, wherein the surge suppression section has a cover comprising a molded resin to cover the three series circuits together, and the cover has fins for heat dissipation.

6. The motor wiring member according to claim 5, further comprising:
a holding section covering a portion of the conductive wires together and holding the conductive wires in a coupled state together,
wherein the cover has an engaging section to be engaged with the holding section, and
wherein the surge suppression section is secured to the holding section by engaging the engaging section with the holding section.

7. The motor wiring member according to claim 1, wherein the one ends of the three series circuits of the surge suppression section are fastened by crimping to the terminals and electrically connected to the conductive wires of respective phases.

* * * * *